Nov. 14, 1944.  G. B. BENANDER  2,362,794
WIRING DEVICE
Filed April 11, 1942  3 Sheets-Sheet 1

Inventor:
George B. Benander,
by Harry E. Dunham
His Attorney.

Nov. 14, 1944. G. B. BENANDER 2,362,794
WIRING DEVICE
Filed April 11, 1942 3 Sheets-Sheet 2
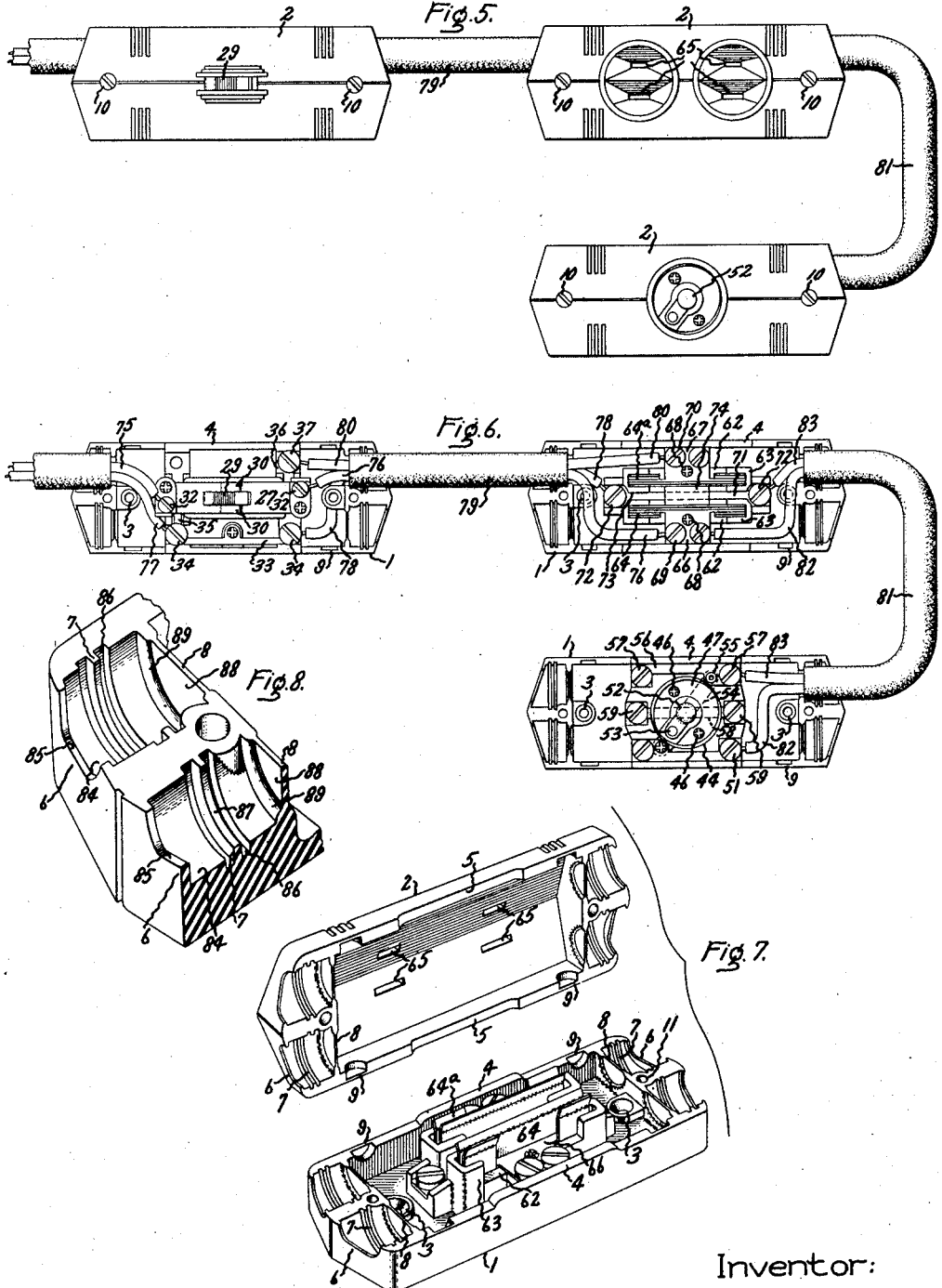
Inventor:
George B. Benander,
by Harry E. Dunham
His Attorney.

Nov. 14, 1944.   G. B. BENANDER   2,362,794
WIRING DEVICE
Filed April 11, 1942   3 Sheets-Sheet 3
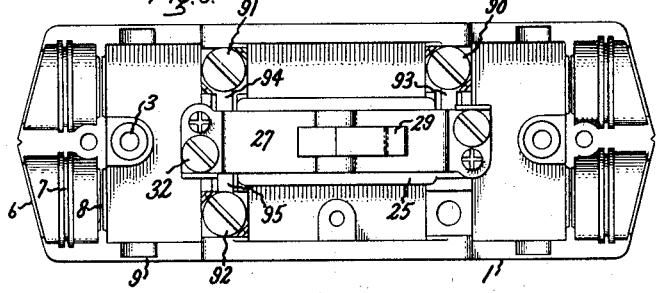
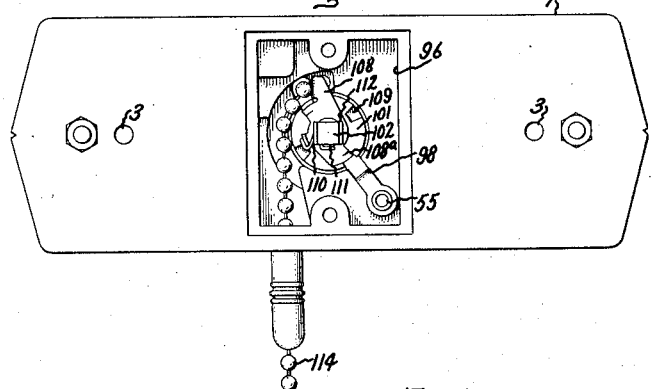
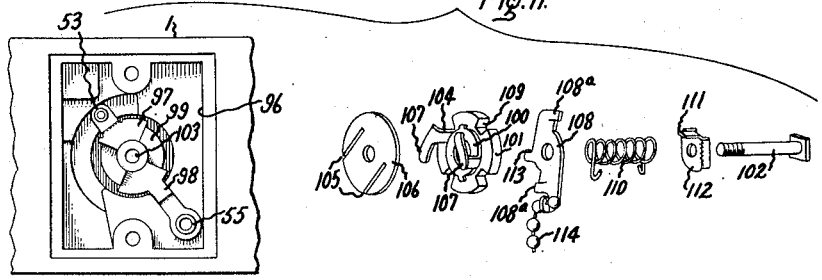
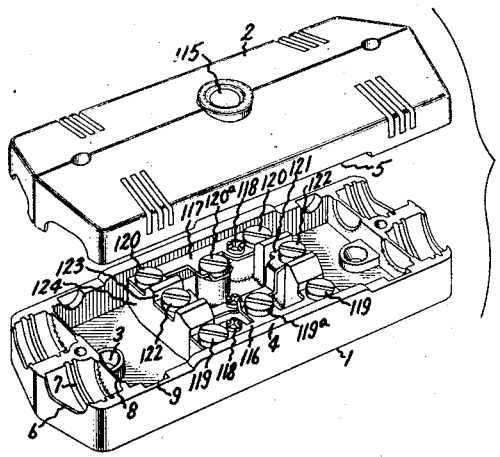
Inventor:
George B. Benander,
by Harry E. Dunham
His Attorney.

Patented Nov. 14, 1944

2,362,794

UNITED STATES PATENT OFFICE 2,362,794

WIRING DEVICE

George B. Benander, Oaklawn, R. I., assignor to Monowatt Electric Corporation, a corporation of Connecticut Application April 11, 1942, Serial No. 438,545

4 Claims. (Cl. 174—64)

The present invention relates to wiring devices of the type in which the device is part of the box for enclosing the connections to the power conductors. Such wiring devices are particularly adapted to surface wiring systems.

Since the device and box are a single unit it is desirable that the number of different devices required for a wiring system be kept to a minimum. In the present invention only six devices are required, namely, a single pole switch, a three-way switch, a duplex receptacle, a rosette or junction box, a lamp socket, and a lamp socket with a pull-chain switch.

It is also desirable that the devices be capable of use in wiring systems using metallic armored cable, non-metallic cable (cable having a non-metallic sheath or armor) and knob and tube open wiring. In the metallic armored cable system, a continuous ground connection must be carried through the metallic armor. In the present invention this is done by means of a ground strap used interchangeably with each of the devices and having clamps for holding the cable and making the ground connection to the metallic armor. In systems using non-metallic cable or open wiring, the ground strap is not necessary and its expense is eliminated.

The object of my invention is to provide an improved construction and arrangement in wiring devices of this type, and for a consideration of what I believe to be novel and my invention, attention is directed to the following description and the claims appended thereto.

Figure 1:
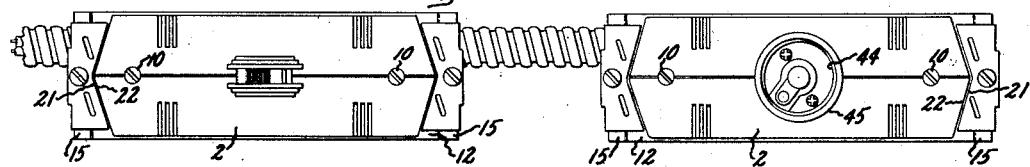
Figure 2:
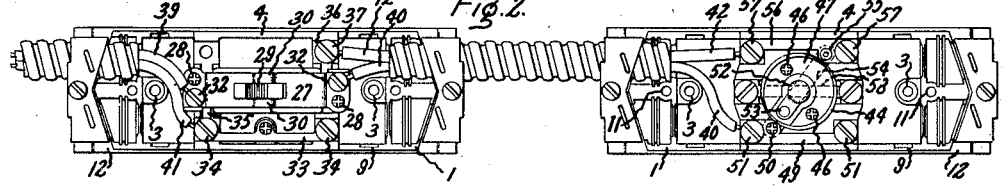
Figures 3, 4:
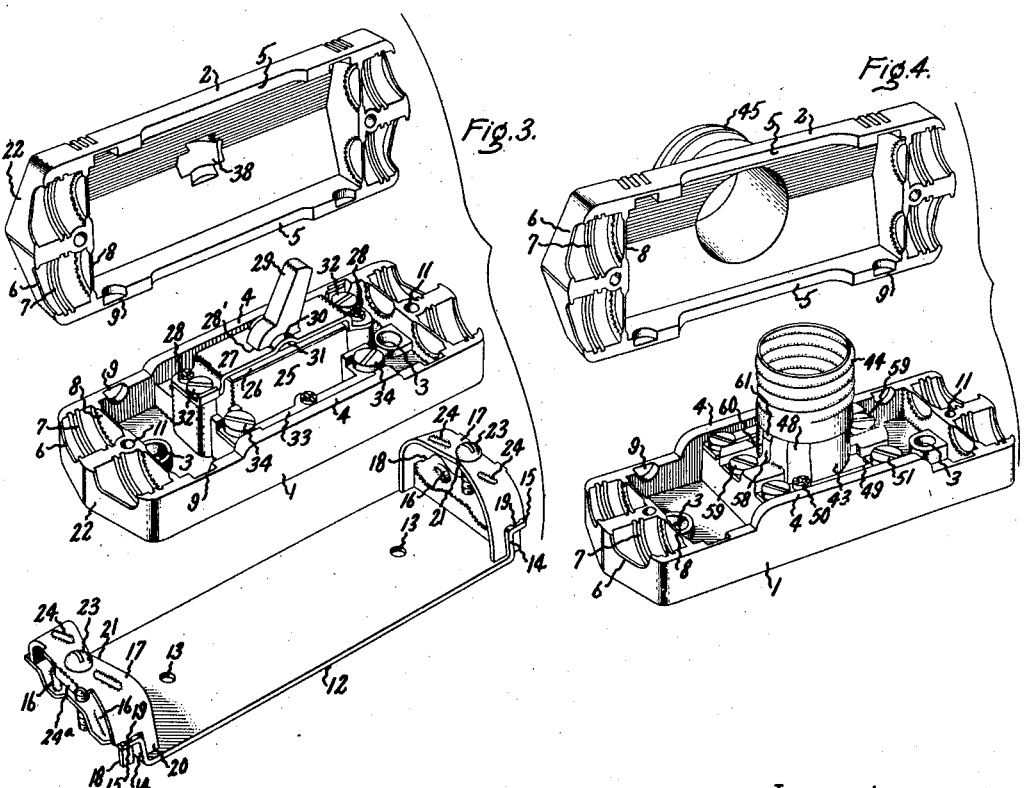

In the accompanying drawings, Fig. 1 is a top plan view of part of a surface wiring system using metallic armored power conductors and wiring devices embodying my invention; Fig. 2 is a view similar to Fig. 1 with the covers of the wiring devices removed; Fig. 3 is an exploded perspective view of the switch appearing in Fig. 1; Fig. 4 is an exploded perspective view of the lamp socket appearing in Fig. 1; Fig. 5 is a top plan view of part of a wiring system using non-metallic armored power conductors and wiring devices embodying my invention; Fig. 6 is a view similar to Fig. 5 with the covers of the wiring devices removed; Fig. 7 is an exploded perspective view of the convenience outlet appearing in Fig. 5; Fig. 8 is a perspective view partly broken away of the conductor clamps; Fig. 9 is a top plan view of a three-way switch with the cover removed; Fig. 10 is a bottom plan view of the pull-chain lamp socket; Fig. 11 is an exploded view of the pull-chain switch; and Fig. 12 is an exploded perspective view of the rosette or junction box.

Referring to the drawings, each of the wiring devices has an elongated base 1 and a cover 2 both of which may be made of suitable molded insulating material. The base is provided with screw holes 3 for attachment to a supporting surface and is narrow enough so that it can be attached to the narrow edge of two-by-four framing when used in an open wiring system. Along the sides of the base members are projections 4 which are of different sizes and which fit in corresponding depressions 5 in the sides of the respective covers. The projections and depressions 4 and 5 insure that the covers are assembled with and properly positioned on the bases for which they are designed. At each end of the device are two openings for armored power conductors. The openings are formed partly in the base and partly in the cover and are blocked by knockouts 6, 7, and 8 of different sizes, one or more of which are removed depending upon the size and type of power conductor to be connected to the device. Along the sides of the cover and base at each end are knockouts 9 for use in open wiring. The covers are attached to the respective bases by screws 10 threaded into sockets 11 in the base, and when assembled the base and cover serve as an outlet box for enclosing the device and its connections with the power conductors clamped between the cover and base.

When the wiring devices are used with metallic armored cable, the ground connection to the armor is made through a ground strap 12 having screw holes 13 in line with the screw holes 3 in the base so that the ground strap and base are secured to the support by the same screws. The base is seated on the ground strap with its ends confined between upwardly extending flanges 14 at the ends of the ground strap. At the top the flanges 14 are bent outwardly to provide horizontal flanges 15 which are suitably indented at 16 to provide the lower half of a clamp for gripping metallic armored cable. The upper half of the clamp is provided by a clamping member 17 having tongues 18 slidable in slots 19 in the flanges 15 and having tongues 20 extending along the inner faces of the flanges 14. The upper clamping member 17 at its top is provided with a tapered recess 21 of the same shape as the tapered projection 22 at the ends of the base and cover so the device may be assembled on the ground strap without disassembling the clamp. The tongues 20 which project inwardly beyond the extreme ends of the base and cover serve to locate the device on the ground strap. The clamping members are held together by screws 23 extending loosely through the center of the upper clamping member 17 and threaded into the center of the flange 15. The upper clamping member is indented at 24 and is provided with a flange 24a for more effectively gripping metallic cable. As shown more clearly in Fig. 2, the openings through the clamps are in line with the openings in the device.

In the single pole switch, as shown most clearly in Fig. 3, the base is provided with a hollow projection 25 housing the switch mechanism which need not be illustrated for the purposes of the present invention. Across the open top of the hollow projection 25 are a strip of insulating material 26 and a metal strap 27 fixed by screws 28 to the ends of the projection 25. The strap 27 is provided with a slot 28' through which the switch handle 29 of molded insulating material projects and is provided with arcuate seats 30 on each side of the slot 28' pivotally engaged by projections 31 integral with the switch handle. The switch handle accordingly is pivoted on the strap 27. At opposite ends the strap 27 is provided with terminal screws 32 so that the strap, which is insulated from the switch, may be used as a bus bar. At one side of the base is fixed a conductive strip or bus bar 33 having terminal screws 34 at opposite ends and at one end having an integral arm 35 (Fig. 2) connected to one of the switch contacts inside the projection 25. The other switch contact is connected to a strip 36 carrying a terminal screw 37 which is on the opposite side of the base from the terminals 34. The switch terminals 34 and 37 are accordingly on opposite sides of the base, and the mounting strap or bus bar 27 which is insulated from the switch terminals and is used to eliminate the need for a jumper extends lengthwise of the base at the center. The switch handle 29 projects out through a slot 38 in the cover.

When the switch is used to control a device at the end of a power line, as shown in Figs. 1 and 2, the ground conductors 39 and 40 are connected by the terminal screws 32 to opposite ends of the strap 27. The incoming live conductor 41 is connected to the terminal screw 34 at one end of the switch, and the outgoing live conductor 42 is connected to the terminal screw 37 at the opposite end. The circuit between the terminal screws 34 and 37 is respectively made and broken in the on and off positions of the switch.

The three-way switch (Fig. 9) is of the same construction as the single pole switch previously described except for the substitution of a three-way switch mechanism. Corresponding parts bear the same reference numerals. The three-way switch mechanism (which may be of any suitable construction) is mounted in the hollow projection 25 and is operated by the handle 29 which projects through the metal strap 27. The switch is provided with terminal screws 90, 91, and 92 respectively threaded into strips 93, 94, and 95 connected to the three-way switch. By operation of the handle the terminal 90 is connected to either the terminal 91 or the terminal 92. It will be noted that the metal strap 27 is available for use as a bus bar to feed a circuit through the device without the use of a jumper.

In the lamp socket, as shown more clearly in Fig. 4, the base 1 is provided at the center with a cylindrical projection 43 on the upper end of which is mounted a screw shell 44, and the cover 2 is provided with a cylindrical projection 45 surrounding the upper end of the screw shell. The screw shell is fixed on the upper end of the projection 43 by screws 46 threaded into the projection through a flange 47 at the bottom of the screw shell. Integral with the screw shell is a metal strip 48 connected to a terminal strip 49 by means of a screw 50 threaded through the strips 48 and 49 into the base. The strip 49 at opposite ends is provided with terminal screws 51. Within the screw shell is a center contact 52 fixed to the upper end of the projection 43 by a rivet 53 which connects the center contact to one end of strip 54 on the under side of the projection 43. The other end of the strip 54 is connected by a rivet 55 to a terminal strip 56 provided at opposite ends with terminal screws 57. The socket terminal screws 51 and 57, like the switch terminal screws 34 and 37, are at opposite sides of the base. At the center of the base is a terminal strip or bus bar 58 provided at opposite ends with terminal screws 59 and extending up over the top of the projection 43 through a groove 60. The bus bar 58 extends beneath the screw shell 44 and center contact 52 and is insulated therefrom by a strip of insulating material 61 in the groove 60 on top of the bus bar 58. The bus bar 58 eliminates the need for jumpers in the same manner as the bus bar 27 in the previously described switch construction. In the wiring system shown in Figs. 1 and 2, the ground conductor 40 is connected to one of the terminal screws 51, and the live conductor 42 in series with the switch terminals 34 and 37 is connected to one of the terminal screws 57.

The lamp socket may be provided with a pull-chain switch (Figs. 10 and 11) arranged in a cavity 96 in the under side of the base and having contacts 97 and 98 respectively connected to the lower ends of the rivets 53 and 55. The cavity may be closed by a plate of insulating material (not shown). The contacts 97 and 98 rest on alternate ratchet faces 99 molded in the base. The circuit between contacts 97 and 98 is alternately made and broken by a bridging member 100 on disk 101 rotatable on a spindle 102 threaded into a hole 103. The bridging member has arms 104 projecting through slots 105 in a disk of insulating material 106 and terminating in contacts 107. The bridging member is rotated in a counterclockwise direction (Fig. 11) through successive "on" and "off" positions by a member 108 having ratchet teeth 108a cooperating with notches 109 in the disk 101. The member 108 is biased in a clockwise direction by a coil spring 110 having opposite ends hooked over a tank 111 on a washer 112 non-rotatable on the head of spindle 102 and over a tang 113 on the ratchet member 108. The member 108 is rotated in a counterclockwise direction by a pull-chain 114 extending out through a suitable opening in the side of the base.

In the wiring system shown in Figs. 5 and 6, the power conductors have a non-metallic sheath or armor and, accordingly, the ground strap is unnecessary. The switch and lamp socket there illustrated are of the same construction as previously described and bear the same reference numerals. In addition there is shown a convenience outlet which will now be described.

The base 1 of the convenience outlet has a projection 62 at each end of which is a pair of U-shaped walls 63 receiving terminals 64 and 64a for connection with the prongs of an attachment plug inserted through openings 65 in the cover. The terminals 64 and 64a are respectively integral with terminal strips 66 and 67 fixed to the projections 62 by screws 68 and equipped respectively with terminal screws 69 and 70. The terminal screws 69 are for connection with the ground conductor, and the terminal screws 70 are for connection with the live conductor. Extending along the base between the terminals 64 is a bus bar or terminal strip 71 having terminal screws 72 at opposite ends. The bus bar 71 is seated in a groove 73 in the base and is held therein by a strip of insulating material 74 which is clamped under the terminal strips 66 and 67. The bus bar 71 eliminates the need for jumpers in the same manner as the bus bars 27 and 58 in the previously described constructions.

In the wiring system shown in Figs. 5 and 6 the switch is used to control the circuit to the convenience outlet and the power circuit is fed through the switch and convenience outlet to the lamp socket. The ground conductors 75 and 76 are connected by the terminal screws 32 to opposite ends of the switch bus bar 27. The incoming live conductor 77 is connected by terminal screw 34 to one end of the strip 33. The other end of the strip 33 is connected through the other terminal screw 34 to a live conductor 78 of a three-conductor cable 79. The other end of the conductor 78 is connected by the terminal screw 72 to one end of the bus bar 71. The remaining conductor 80 of the three-conductor cable is connected at one end to the switch terminal screw 37 and at the other end to one of the convenience outlet terminal screws 70. The power circuit to the convenience outlet, which consists of the conductors 76 and 80 of the three-conductor cable 79, is accordingly controlled by the switch. The lamp socket is fed by a cable 81 having a ground conductor 82 connected to the remaining ground terminal screw 69 of the convenience outlet and a conductor 83 connected to the terminal screw 72 at the other end of the bus bar 71. The conductors 82 and 83 are respectively connected to the ground and live terminal screws 51 and 57 of the lamp socket.

In the above described construction the power is fed through the switch terminals to the convenience outlet and is fed to the lamp socket independent of the switch terminals.

It is also possible to use the switch in a circuit in which the switch is beyond the load, as would be the case if the power were fed into the circuit through the cable 81. The connections would be as illustrated. The ground circuit would run from conductor 82 through terminal screws 69, conductor 76, terminal screws 32 and strap 27 to conductor 75. The live circuit to the convenience outlet would run from conductor 83 through bus bar 73 and conductor 78 to switch contact 34 and from switch contact 37 back to the convenience outlet through conductor 80. The live circuit would be fed beyond the switch by conductor 77 connected to the terminal strip 33.

The device shown in Fig. 12 may be either a rosette or a junction box, depending on whether or not a knockout 115 in the cover is removed. At opposite sides of the base are terminal strips 116 and 117 fastened thereto by screws 118. The terminal strips are provided with terminal screws 119 and 120 at opposite ends and terminal screws 119a and 120a at the center. At the center of the base is a bus bar 121 having terminal screws 122 at opposite ends arranged in notches 123 in bosses 124 which separate the terminal screws 119 and 120. The terminal screws 122 are somewhat higher than the other terminal screws. Between the terminal screws 122 the bus bar 121 is bent to provide a U-shaped connecting portion the base of which is below the center terminal screws 119a and 120a. The drop center construction of the bus bar 121 provides ample clearance between the bus bar and terminal screws 119a and 120a to which conductors would be connected when the device is used as a rosette.

In each of the above described wiring devices the device and its enclosing box comprise a complete unit with the openings and clamps for power conductors. The terminals for the device are located on opposite sides of the enclosing box, and at the center is a bus bar insulated from the device which, as described above, may be used to feed a circuit through the device without the use of jumpers or other connections. The wiring is accordingly simplified since all of the wiring connections are made to terminal screws.

The use of the devices is further simplified by the conductor clamping arrangement having knockouts 6, 7, and 8 for use with #12 and #14 two and three conductor metallic and non-metallic armored cable and knockouts 9 for use with #12 and #14 open wiring. The knockouts 6, 7, and 8 are spaced apart along conductor receiving grooves 84 at each end of the base 1 and cover 2. The knockouts 6 are at the outer ends of the grooves and have surfaces 85 for gripping two conductor non-metallic cable in sizes #12 and #14. The knockouts 7 are arranged in channels 86 transverse to the length of the grooves 84 and have surfaces 87 projecting above the grooves 84 for gripping three conductor non-metallic and B. X. cable in size #14 and two conductor B. X. in sizes #12 and #14. The knockouts 7 may be removed by a screw driver or similar prying tool inserted into the space between the knockout and the sides of the channel 86. The knockouts 8 have thin removable sections 88 at the inner edges of ribs 89. The sections 88 form closures for the grooves 84 and when removed provide sufficient space for leading the conductors into the device as illustrated in Figs. 2 and 6. The grooves 84 are shaped to properly grip the largest conductors (three conductor #12 non-metallic and B. X.) for which the devices are designed. By removing one or more of the knockouts 6, 7, and 8, the device may be used with the customary sizes of armored cable. No adjustment of the conductor clamp is required other than the selective removal of the proper knockouts.

Certain features disclosed are not claimed herein as they form subject matter of my two divisional applications Serial Numbers 531,797 and 531,798, both filed April 19, 1944.

What I claim as new and desire to secure by Letters Patent of the United States is:

1. In a wiring device for wiring with a plurality of conductor sizes, mating parts of insulating material enclosing the device and having formed therein a clamp for armored conductors of different sizes, said clamp comprising a conductor receiving groove in said parts and a plurality of knockouts spaced along said groove, said knockouts having conductor gripping surfaces projecting different heights above said groove and respectively shaped to serve, prior to removal, as clamps for different conductor sizes whereby the clamp may be conditioned for a larger conductor size by removing the knockout for a smaller conductor size.

2. In a wiring device, a part of breakable insulating material having a conductor receiving groove, a channel in the walls of the groove extending transversely to the length of the groove, and an integral knockout in the bottom of the channel having a portion projecting above the walls of the groove, said knockout being spaced from the sides of the channel so it may be broken out by a tool inserted between the knockout and the channel.

3. In a wiring device, a conductor clamp of breakable insulating material having a conductor gripping surface, a channel in said surface, and a knockout joined to the clamp in said channel and spaced from the sides of the channel so it may be broken out by a tool inserted between the knockout and the channel and projecting above the channel, the projecting part of said knockout being formed to provide a conductor gripping surface prior to its removal.

4. In a wiring device for wiring with a plurality of conductor sizes, a split conductor clamp having mating parts of insulating material provided with a conductor receiving groove, a knockout at one end of the groove closing the same, a knockout at the other end of the groove partially closing the same projecting to a height above the groove and shaped to provide, prior to its removal, a conductor gripping surface for one of the conductor sizes for which the device is adapted, and a knockout intermediate the other knockouts projecting to a lesser height and shaped to provide, prior to its removal, a conductor gripping surface for one of the larger conductor sizes for which the device is adapted.

GEORGE B. BENANDER.